United States Patent
Ille

(10) Patent No.: US 10,026,244 B2
(45) Date of Patent: Jul. 17, 2018

(54) PARKING AREA ACCESS CONTROL SYSTEM AS WELL AS A METHOD FOR THE CONTROL OF THE ACCESS IN A PARKING SPACE

(71) Applicant: DESIGNA Verkehrsleittechnik GmbH, Kiel (DE)

(72) Inventor: Stefan Ille, Osdorf (DE)

(73) Assignee: DESIGNA Verkehrsleittechnik GmbH, Kiel (DE)

( * ) Notice: Subject to any disclaimer, the term of this patent is extended or adjusted under 35 U.S.C. 154(b) by 31 days.

(21) Appl. No.: 15/007,685

(22) Filed: Jan. 27, 2016

(65) Prior Publication Data
US 2016/0217632 A1 Jul. 28, 2016

(30) Foreign Application Priority Data
Jan. 28, 2015 (DE) .................. 10 2015 201 420

(51) Int. Cl.
| G07C 9/00 | (2006.01) |
| G07B 15/04 | (2006.01) |
| G06Q 20/32 | (2012.01) |
| G07F 17/00 | (2006.01) |
| G07C 1/30 | (2006.01) |

(52) U.S. Cl.
CPC ..... *G07C 9/00007* (2013.01); *G06Q 20/3224* (2013.01); *G07B 15/04* (2013.01); *G07C 1/30* (2013.01); *G07F 17/0021* (2013.01)

(58) Field of Classification Search
CPC .......... G07C 9/00007; G07C 9/00119; G07C 9/00309; G06Q 20/3224; G07B 15/04; G07F 17/0021; G08C 17/02; G08C 2201/93
See application file for complete search history.

(56) References Cited

U.S. PATENT DOCUMENTS

| 2004/0012481 A1* | 1/2004 | Brusseaux | ............... E04H 6/42 |
| | | | 340/5.7 |
| 2006/0212566 A1* | 9/2006 | Boujard | ................ G07B 15/04 |
| | | | 709/224 |

(Continued)

FOREIGN PATENT DOCUMENTS

WO 2014/072751 A1 5/2014

*Primary Examiner* — Thomas Alunkal
(74) *Attorney, Agent, or Firm* — McGlew and Tuttle, P.C.

(57) ABSTRACT

A parking area access control system includes a first blocking device (6) with a data communication connection to a central control device (2) for opening by a control device command. An identification element (22), with an unambiguous identification key, is arranged on the first blocking device (16). A mobile communication apparatus (20) is connected to the control device for data communication and is configured to read out the identification key from the identification element. The mobile communication apparatus (20) and the control device (2) interact such that the identification key is transmitted from the communication apparatus to the control device and, the control device or the mobile communication apparatus generates a temporary parking key. The control device (2), as a reaction to a request signal (6) sent from the communication apparatus (20) to the control device, opens the first blocking device which is identified by the identification key.

20 Claims, 1 Drawing Sheet

(56) References Cited

U.S. PATENT DOCUMENTS

| | | | | |
|---|---|---|---|---|
| 2011/0313893 A1* | 12/2011 | Weik, III | ............... | B60R 25/00 |
| | | | | 705/28 |
| 2012/0265585 A1* | 10/2012 | Muirbrook | ............ | G06Q 20/20 |
| | | | | 705/13 |
| 2014/0085110 A1* | 3/2014 | Scofield | ................ | G07B 15/04 |
| | | | | 340/932.2 |
| 2015/0025947 A1* | 1/2015 | Dutta | ..................... | G06Q 10/02 |
| | | | | 705/13 |
| 2015/0310681 A1* | 10/2015 | Avery | ............... | G07C 9/00119 |
| | | | | 340/5.61 |

* cited by examiner

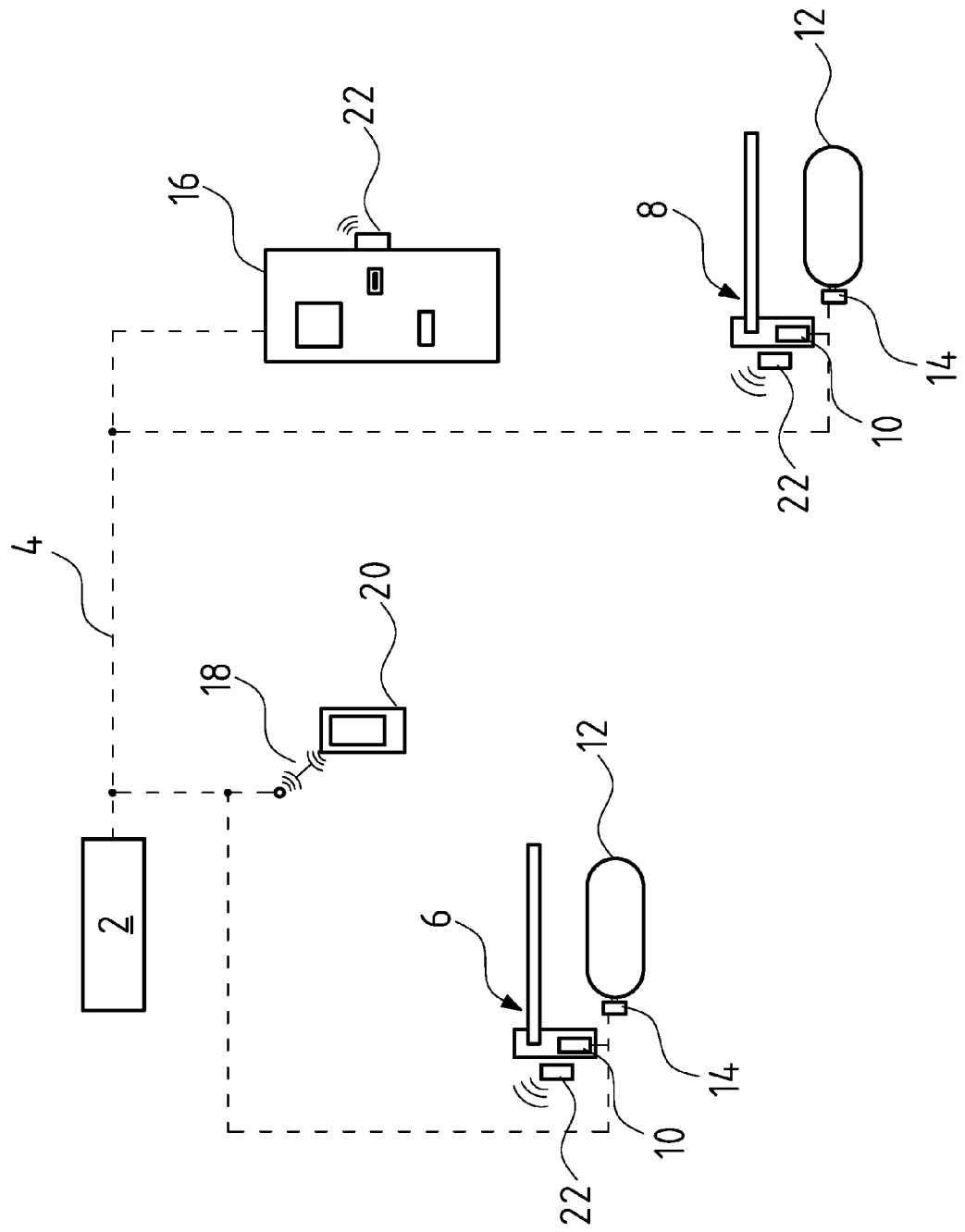

PARKING AREA ACCESS CONTROL SYSTEM AS WELL AS A METHOD FOR THE CONTROL OF THE ACCESS IN A PARKING SPACE

CROSS REFERENCE TO RELATED APPLICATIONS

This application claims the benefit of priority under 35 U.S.C. § 119 of German Patent Application 10 2015 201 420.7 filed Jan. 28, 2015, the entire contents of which are incorporated herein by reference.

FIELD OF THE INVENTION

The invention relates to a parking area access control system as well as to a method for the control of the access in a parking space.

BACKGROUND OF THE INVENTION

Parking spaces or parking lots such as multi-storey car parks, parking garages or car parks, for which a parking fee is charged, are usually blocked by barriers, wherein a parking ticket is pulled when driving in, before the opening of the entrance barrier. Before exit, this must then be paid at a pay desk or pay station, in order to be able to subsequently open the exit barrier. It is known to replace such a parking ticket of paper by way of an electronic emitter, for example for regular parkers. Moreover, systems are known, with which mobile telephones such as smartphones can be used as a replacement for a parking ticket. Thereby, the smartphone communicates with the entrance barrier which for this must be provided with a suitable communication device and software. This renders such systems complicated and expensive for the operator of a multi-storey car park or car park. Moreover, it is known for the user to identify himself on entry into a multi-storey car park, for example via a mobile telephone, wherein the mobile telephone for this transmits an apparatus recognition or other identification feature to the system controlling the barriers of the multi-storey car park. These applications have the disadvantage that the personal data of the user must be stored and processed in the management/administration system of the multi-storey car park, which demands a corresponding memory requirement and moreover sets increased demands concerning data protection.

SUMMARY OF THE INVENTION

It is an object of the invention, to provide an improved parking area access control system and well as a corresponding method for the control of the access in a parking area, which permits the access control in a simplified manner amid the use of mobile communication apparatus such as smartphones, and can be integrated into existing parking area access control systems in a simple manner.

The parking area access control system according to the invention serves for determining parking fees on a car park or in a multi-storey car park, which is to say for controlling that only the authorized can use the parking area. The parking area access control system according to the invention comprises at least one first blocking device such as a barrier or a gate, which preferably blocks an access to the car park or multi-story car park. The first blocking device is preferably electrically driven, so that it can be opened and closed by way of an electric signal. For this, the at least one first blocking device is connected to a central control device such that a data communication is possible between the control device and the first blocking device, said communication permitting the sending of a command from the control device to the blocking device, so that this blocking device opens. The first blocking device can preferably be closed likewise at the command of the control device via the communication connection. Alternatively or additionally, the first blocking device in a local control can have an automatic, e.g. time-controlled closure function. Moreover, it is possible to detect the passage of a vehicle via detector elements, such as induction loops, and to close the blocking device again in an automatic manner after the passage of the vehicle. The communication connection between the central control device and the at least one first blocking device is preferably configured as a digital communication connection. The blocking device for this comprises a local control which contains a communication interface. The central control device comprises a corresponding communication interface.

A car park or a multi-storey car park may comprise several first blocking devices which are preferably controlled by a common, central control device. This is particularly the case if the car park or the multi-storey car park has several accesses which then are blocked in each case by a first blocking device.

An identification element is moreover arranged on the at least one blocking device and comprises an identification key which unambiguously identifies the blocking device and which can be read out, as described hereinafter. If the system comprises several first blocking devices, then each first blocking device preferably comprises an individual identification element which identifies the respective first blocking device by way of an unambiguous identification key. The system according to the invention moreover uses at least one mobile communication apparatus which is connected to the control device for data communication. This too is preferably a digital data communication, wherefore the communication apparatus comprises a suitable communication interface which can communicate with the communication interface of the control device via a communication connection. The mobile communication apparatus is moreover configured such that it can read out the identification key from the identification element. This, in particular, can be effected optically or electromagnetically. I.e. the identification element provides the identification key in a suitable manner, so that this can be read out or detected by a matching sensor of the communication apparatus. Thereby, the identification element and the communication apparatus are preferably configured such that the reading-out or the transmitting of the identification key from the identification element to the communication apparatus is only possible in a limited range, preferably in a range of less than five, preferably less than two meters.

The mobile communication apparatus and the control device moreover interact in a manner such that the identification key which is read out by the communication apparatus is transmitted from the communication apparatus via the communication connection to the control device, and the control device as a reaction to a request signal sent from the communication apparatus to the control device opens the first blocking device which is identified by the identification key. The control device for this sends the respective opening command to the blocking device via the communication connection.

The parking area access control system according to the invention in particular permits the parking procedure to be accomplished in a paperless manner amid the use of a mobile communication apparatus, wherein the user or the mobile communication apparatus remain anonymous to the system, i.e. no personal data needs to be stored or filed in the system. This on the one hand simplifies the system construction, since the quantity of data to be stored can be kept low. On the other hand no special demands concerning data protection are necessary, since no person-related data or data permitting the identification of the communication apparatus needs to be transmitted or processed.

The control device is moreover configured in a manner such that after receiving the request signal from the mobile communication apparatus, and an identification key of a first blocking device blocking the entrance and transmitted from the mobile communication apparatus, it generates a temporary parking key and sends it to the communication apparatus. The control device preferably generates the temporary parking key from the identification key received from the communication apparatus and from a time stamp. Alternatively, the mobile communication can also be configured such that a temporary parking key, as the case may be after request by the central control device, is generated in the mobile communication apparatus itself and then preferably transmitted via the communication connection to the central control device. It is ensured that the temporary parking key is known to the control device as well as to the mobile communication apparatus by way of the transmission via the communication connection, independently of where the temporary parking key is generated, so that an identification of the mobile communication apparatus by the control device becomes possible via the temporary parking key. The temporary parking key is preferably generated such that no personal information of the user whatsoever and no specific information of the respective mobile communication apparatus whatsoever are used. The temporary parking key can thus be generated for example solely from the received identification key and a time stamp. Inasmuch as this is concerned, the parking procedure can be processed in a completely anonymous manner. The generated temporary parking key serves as a virtual parking ticket for the processing of the parking procedure, in particular for a later payment procedure and/or for identification at the exit, i.e. at a blocking device blocking a departure. Thus, an identification of the mobile communication apparatus by the control device is effected preferably exclusively on the basis of the produced temporary parking ticket, with the further processing of the parking procedure, in particular with the payment procedure and with the exit/departure. The temporary parking key can thus assume all functions which a conventional parking ticket of paper has.

A one-off, unambiguous parking key is thus created when the temporary parking key is generated from the identification key and the current time stamp, since it is not possible for two vehicles to be simultaneously present in front of the same first blocking device, i.e. for example the same barrier of a multi-storey car part, and to simultaneously transmit the same identification key of the blocking device to the central control device by a communication apparatus located in the vehicle.

The mobile communication apparatus further preferably comprises a memory and is configured such that it stores the temporary parking key. Thereby, the mobile communication apparatus stores the temporary parking key preferably at least for the duration of the complete parking procedure, i.e. until the passage through a blocking device blocking the exit, and thus permits the unambiguous identification of the user during the complete parking procedure and, as the case may be, also for a payment procedure. Thereby, as described above, preferably no personal data of the user and of the communication apparatus whatsoever is used, so that the user and his communication apparatus can remain completely anonymous.

This described access control system permits a multitude of first blocking devices to be controlled in the described manner via a central control device, in a simple manner. The access control system thus preferably comprises a multitude of blocking devices and is moreover suitable for interacting with a multitude of mobile communication apparatus. The advantage of the system according to the invention lies in the fact that no direct communication is necessary between the communication apparatus and the blocking device, in order to effect the opening procedure of the blocking device. According to the invention, in contrast, one envisages the blocking device, in whose proximity the mobile communication apparatus is located, identifying itself to the mobile communication apparatus. The mobile communication apparatus then transmits the respective identification key to the central control device and with this notifies the central control device of the blocking device at which the apparatus is currently located. The control device comprises a memory or a data bank, in which the identification keys of the individual blocking devices are stored, so that the control device recognizes the blocking device, at which the communication apparatus which has transmitted the identification key, is currently located. Thus a vehicle, on which or in which the mobile communication apparatus is located, can be recognized in front of exactly one defined blocking device, and this blocking device can then be opened at the command of the central control device. A further advantage of the system is the fact that the opening commands are given exclusively by a the central control device, so that misuse due to manipulating a local data communication between a mobile communication apparatus and the blocking device or its local control is ruled out.

Further preferably, the parking area access control system comprises at least one second blocking device which is connected to the central control device for data communication, in a manner such that the second blocking device can be opened by a command of the control device. The data communication which is necessary for this can be configured in the same manner as is described for the first blocking device. The second blocking device is preferably a blocking device which blocks an exit of a multi-storey car park or a car park. Here too, several second blocking devices can be present in the parking area access control system. An identification element with an identification key which unambiguously identifies the at least one second blocking device, can be read out by the mobile communication apparatus and can be transmitted by this to the control device via a communication connection, is preferably arranged on this blocking device. This is effected in the same manner as has been described above by way of the first blocking device and its identification element. The identification elements of the second blocking devices are configured in the same manner.

Further preferably, the control device is configured in a manner such that on receiving an identification key of a second blocking device blocking an exit, from the mobile communication apparatus, the control device retrieves the temporary parking key stored in the communication apparatus and opens this blocking device after the verification of a payment procedure for this apparatus recognition or this parking key. With regard to the parking key, it is particularly preferably the case of the previously described temporary parking key. I.e. here the control device is preferably configured such that when the mobile communication apparatus notifies itself to the blocking device of the exit, it firstly verifies as to whether payment has been made for the respective parking procedure characterized by the temporary parking key, and only when it is ensured that the payment procedure has been completed does it then give a command via the communication connection to this second blocking device, for it to open. Otherwise the exit is refused, as with conventional parking tickets. I.e. the temporary parking ticket here is used analogously to a conventional parking ticket.

A payment procedure can be processed for example directly between the mobile communication apparatus and the central control device, or also in any other manner, in particular in a direct manner by the central control device. An online payment, a payment by way of a credit card or likewise are possible for example. Thus, for example, it is conceivable for bank data or credit card data to be stored in the central control device for a user, and for him to then be able to send a payment command via the mobile communication apparatus and by way of the communication connection, to the control device which then carries out a payment procedure with the help of the stored data. It would also be possible for the necessary credit card data or bank data to be stored in the mobile communication apparatus and for a payment procedure to be transmitted to the control device. A payment procedure via a third party may also be provided.

According to a particular embodiment of the invention, a payment by way of a payment terminal is however alternatively or additionally envisaged. A manually operated cash till can also be used in a corresponding manner. Inasmuch as this is concerned, with the payment system according to the invention, the "virtual parking ticket" according to this embodiment can be paid in the same manner as is possible with conventional parking tickets. For this, at least one payment terminal which is connected to the control device for data communication is provided, and the control device is preferably configured in a manner such that it opens the at least one second blocking device on receiving the request signal and after confirmation of a payment procedure by the payment terminal. The communication between the payment terminal and the control device can function just as well in the manner described above, as with the communication between the control device and the blocking devices, i.e. in particular via a network connection and the internet. Thus, for example, it is possible for the user, for example with his bank card, bank notes or coins, to pay the amount at the payment terminal, for this payment terminal to notify the payment procedure to the control device via the communication connection, and for this control device, when it receives a request signal for opening an exit blocking device, i.e. the second blocking device, from the associated mobile communication apparatus, to open this exit blocking device.

One preferably envisages the payment terminal, for data communication, being connected to the control device in the previously described manner and comprising an identification element with an identification key unambiguously identifying the payment terminal, in order to be able to identify the payment terminal or a check-out in such a system in a simple manner, wherein the at least one mobile communication apparatus is configured for reading out the identification key from the identification element, and the mobile communication apparatus and the control device interact in a manner such that the identification key which is read out by the communication apparatus is transmitted from the communication apparatus to the control device, and the control device initiates the thus identified payment terminal into carrying out the payment procedure. The identification element which is arranged on or in the payment terminal can be configured in the same manner as the identification elements of the blocking devices which are described above. This means that if the mobile communication apparatus has received the identification key at the payment terminal and is configured such that it transmits this key together with the payment request signal to the control device via the existing data connection, the control device which in turn is connected to the payment terminal for data communication, can activate the payment terminal in a manner such that this payment terminal initiates the payment procedure, i.e. displays to the user the amount which is to be paid and after payment of the amount notifies back to the control device that the amount has been paid. Preferably, the described parking key, i.e. the temporary parking key is transmitted to the control device simultaneously with the identification key of the respective payment terminal, in order to identify the user, for whom the payment procedure is to be carried out. If thereby, it is the case of an anonymous parking key, as has been described beforehand, then a completely anonymous payment procedure is possible, without having the render user-specific data accessible to the control device.

Moreover, a direct bidirectional communication between the communication apparatus and the payment terminal is not necessary for the processing of the payment procedure at such a payment terminal, and this reduces the danger of manipulation and increases the data security. In contrast, the required communications are effected alone via the data connection between the mobile communication apparatus and the control device, and the control device and the payment terminal which for this is likewise provided with a communication interface configured in a suitable manner. This communication interface can likewise be a network interface of the design which has been described previously by way of the blocking devices. If a multitude of payment terminals is envisaged, it is thus possible for the user to carry out the payment procedure at any payment terminal due to the fact that the payment terminal is identified via the identification element, for the control device. It can likewise make sense, in the communication apparatus, to detect the distance of the radio emitter forming the identification element, and to only take into account an identification element which is situated at an adequately small distance, for an unambiguous identification. With a plurality of payment terminals which are arranged next to one another, it is therefore possible to identify precisely that payment terminal which is in front of the user.

The identification element is preferably a radio emitter, in particular according to the Bluetooth low energy standard (BLE), and the communication apparatus preferably comprises a corresponding radio receiver. With regard to the radio receiver of the communication apparatus, it is the case of a common Bluetooth interface which nowadays is provided as standard e.g. in mobile telephones. Identification elements according to the Bluetooth low energy standard are known as so-called "beacons" and continuously and repeatedly emit a radio signal with a short range, which contains the identification key. Such an identification element only has a low energy requirement, so that an energy supply by way of batteries is also possible. Above all however, such an identification element is completely independent of the local control of the blocking device, since as an autonomous system it merely has the task of continuously emitting the identification key. A further communication or direct interaction with a local control of the respective first or second blocking device is not envisaged in the system according to the invention. This has the advantage that such an identification element can be retrofitted in existing installations without further ado and without having to carry out changes in the existing local installation control of the blocking device. One merely needs to connect an energy supply for the identification element as the case may be. Moreover, such a Bluetooth signal can be received with a standard mobile telephone, such as with a smartphone, when the smartphone is located in a sufficient proximity to the radio emitter of the identification element. The distance or space to the radio emitter can also be determined by way of a suitable application in the mobile communication apparatus, so that the communication apparatus can be configured such that it transmits the identification key to the central control device only when the identification element is at a defined or short distance to the communication apparatus. Thus, error functions can be avoided if for example several first blocking means are arranged next to one another at the entrance of a multi-storey car park. If the limit value for the distance is selected sufficiently short, for example shorter than 2 or shorter than 1 meter, it can then be ensured that the communication apparatus does not inadvertently send the identification key of an adjacent blocking device, instead of that blocking device, in front of which the vehicle with the communication apparatus is located, to the control device.

The at least one blocking device (first and/or second blocking device) is connected to the control device preferably via a data network, in particular via the internet. This permits the control device to be placed at a large distance to the blocking device. The blocking device, as described above, comprises a local control with a corresponding communication interface, in order to permit the communication via the data network. The communication interface can be a common network connection, i.e. for example an WLAN or Ethernet connection, which permits the communication device to be connected to the control device via a computer network and in particular via the internet, for communication. The control device is preferably a server system which in particular is configured such that it centrally controls a multitude of parking areas with a multitude of blocking devices.

The at least one mobile communication apparatus is connected to the control device, preferably via a data network, in particular via a mobile network (cellular network) and/or the internet. The connection to the internet is preferably effected via a mobile network. This permits the communication apparatus to communicate with the central control device from almost any location. Thereby, it is particularly advantageous that one can fall back on existing communication systems, so that no additional hardware structures need to be constructed in the access control system according to the invention, for this communication connection, so that investments concerning this become superfluous. The access control system according to the invention can therefore be integrated or retrofitted into existing structures in a very simple manner.

Particularly preferably, the at least one mobile communication apparatus is a mobile telephone or a communication apparatus which is integrated into a vehicle. With regard to the mobile telephone, it can be the case of a standard mobile telephone, in particular a smartphone. Such an apparatus comprises the necessary communication interface for connection to the mobile network. Such mobile telephones moreover usually comprise Bluetooth interfaces which permit the reception of an identification key from a Bluetooth low energy radio emitter as an indication element, without further ado. Inasmuch as this is concerned, no special hardware is necessary, in order to read out the identification key in the previously described manner. If the mobile communication apparatus is a communication apparatus which is integrated into a vehicle, then it can thereby be the case of a communication device, a navigation system or an entertainment system, which is integrated into the vehicle. Integrated systems which integrate communication, navigation and entertainment functions into one apparatus are often provided in modern vehicles. These apparatus as a rule have their own mobile radio interface, in order for example permit to the reception of traffic data, navigation data and likewise, or have access to a connected mobile telephone for communication, in particular also data communication via the internet. These systems often also comprise Bluetooth interfaces, in order to permit the connection of mobile telephones. Such a Bluetooth interface can likewise be used in order to receive an identification key from a Bluetooth low energy radio emitter, as has been described previously. The functions which are necessary for the access control system according to the invention can therefore be implemented into such a communication apparatus integrated into a vehicle, or a mobile telephone, preferably as a software application. This has the advantage that the user of the access control system according to the invention and who wishes to enter a multi-storey car park requires no special hardware, but can accordingly upgrade the vehicle electronics which are present in any case, or his mobile telephone, in simple manner, so that he can use the described functions of the access control system.

As described, the mobile communication apparatus is preferably a common mobile telephone, into which the functions necessary for the access control system according to the invention are integrated by a software application, a so-called "app". Such a mobile telephone for example can be a mobile telephone operating with an android operating system, IOS operating system or windows operating system. These operating systems, as also other smartphone operating systems, are configured such that additional software applications can be installed. Such a software application can then access the interfaces which are present in the mobile telephone, in particular the Bluetooth interface and the mobile radio (cellular) interface, in order to realize the functions which are described here.

Further preferably, the central control device and the mobile communication apparatus or the software providing the functions of the mobile communication apparatus are configured such that a bidirectional data communication is effected between the mobile communication apparatus and the control device. Thus, not only can data as for example the detected identification key be transmitted in the direction from the communication device to the control device, but also in the reverse direction, for example in order to process a payment procedure for the parking, directly between the communication apparatus and the control device.

The identification element and the at least one mobile communication apparatus in contrast are preferably configured for a unidirectional communication between the identification element and the communication apparatus. I.e. preferably, no data whatsoever is transmitted from the communication apparatus to the respective blocking device (first or second blocking device), its local control or the identification element. As described above, preferably only the receiving or a reading of the identification key from the identification element is carried out. I.e. no data is transmitted locally from the communication apparatus, which provides an additional data security.

According to a further preferred embodiment, at least one detector is arranged on the at least one first blocking device and/or the at least one second blocking device, and this detector is connected to the control device for data communication and is configured for the detection of a vehicle which is in front of the blocking device. Such a detector device can for example be an induction loop in the roadway, said induction loop detecting (registering) a vehicle. Preferably, several such detector devices which can additionally detect the passage of the vehicle are present at the blocking device. Such detectors can be connected directly to a local control of the blocking device and transmit signals which for example signalize the presence of a vehicle in front of or after the blocking device, via the blocking device or its local control to the central control device in the manner described above. This data communication is preferably likewise effected via the internet in the described manner. The detector devices could also themselves be provided with detector controls comprising communication interfaces for the direct connection to a data network and preferably to the internet for data transmission to the control device, instead of connecting the detector device to the local controls of the blocking devices.

Apart from the previously described parking area access control system, the subject matter of the invention is also a corresponding method for the access control into a parking area, wherein the method comprises the following steps:

reading out an identification key of a first blocking device blocking an access, by a mobile communication apparatus, transmitting the read-out identification key from the mobile communication apparatus to a central control device, transmitting a request signal for requesting the opening of the blocking device, from the communication apparatus to the central control device, generating a temporary parking key in the control device or the mobile communication apparatus and opening the blocking device identified by the identification key, by way of the central control device, as a reaction to the request signal.

It is to be understood that the identification key and the request signal can be transmitted one after the other or however also simultaneously. If the temporary parking key is generated in the control device, then it is subsequently transmitted via the data connection to the mobile communication apparatus, so that the temporary parking key is known to both side of the system and can subsequently be used for the identification of the mobile communication apparatus, i.e. can function as a virtual parking ticket. If conversely, the temporary parking ticket is produced in the mobile communication apparatus, then it is subsequently transmitted to the central control device, so that the temporary parking key is likewise known to both sides in this manner. The transmission of a temporary parking key which has been produced in the mobile communication apparatus can be effected for example together with the request signal or also function itself as a request signal. The mobile communication apparatus at a later stage can transmit the temporary parking key to a control device, for identification at a payment terminal or a second blocking device blocking the exit. The preceding description of the access control system, from which the corresponding method process likewise results, is referred to with regard to the further course or procedure of the method and to possible preferred embodiments and details.

The method according to the invention preferably comprises the following steps:

reading out an identification key of a second blocking device blocking an exit, by the mobile communication apparatus, transmitting the read-out identification key from the mobile communication apparatus to the central control device, transmitting a request signal with the temporary parking key for requesting the opening of the second blocking device, from the communication apparatus to the central control device, verification of a payment procedure for the received, temporary parking key, by the control device and opening the second blocking device which is identified by the identification key, by the central control device given a successful verification.

The exit out of the parking area, i.e. a multi-storey car park or car park is controlled with the method in this manner. The second control device which blocks the exit is only released when it is ensured by the control device that the parking time has been paid for. The payment can thereby be effected in various ways, as have been described beforehand. It is also possible to integrate the payment procedure directly into the described process of the method, i.e. into the verification procedure of the payment procedure. This particularly lends itself if the payment procedure is to be effected directly via the mobile communication apparatus or stored bank data, in the manner described above. Alternatively, it is also possible to process the payment procedure in the previously described manner via a payment terminal. The control device, just as with a conventional parking ticket, then examines as to whether the parking time has been paid for the stored temporary parking key, before the second blocking device blocking the exit is opened.

The control device preferably opens a blocking device only if a vehicle in front of this blocking device is recognized by a detector. Such a detector can be an induction loop for example, as previously described. It is ensured that the blocking device for example is not opened for a pedestrian by way of this procedural manner.

With regard to the described method, it is to be understood that features which have only been described in the context of the method, in a corresponding manner can also be implemented in the access control system, and vice versa.

The basic concept of the access control system as well as the method is to utilize existing communication structures which are already present in existing parking area access control systems, specifically communication connections between payment terminals, blocking devices and a central control device, in order to process the access control and, as the case may be, a payment procedure, via a mobile communication apparatus, such as a mobile telephone for example. Only additional software applications and a communication possibility of the mobile telephone with the internet are required in order to render this possible. No additional communications structures need to be constructed in the multi-storey car park or on the respective car park. One merely needs to attach the described identification elements on the respective component of the system, for example the blocking devices and, as the case may be, the payment terminals. All remaining constituents of the system or of the method can be implemented by the conventional communication connections and structures. This is a great advantage for retrofitting the system into existing systems. The use of the identification elements such as Bluetooth radio emitters moreover has the advantage that a very precise localization of the respective communication apparatus in the proximity of the respective identification element is possible. It is thus not necessary to fall back on GPS location data of the mobile communication apparatus, which also permits the application in closed spaces and moreover permits a significantly greater accuracy, since the location position of the communication device relative to the identification element can be determined to the decimeter. A further essential concept is to generate a temporary parking key for each parking procedure, and this parking key is used as an identification element for the respective user, for the further processing of the parking procedure. In this manner, it becomes unnecessary for person-related data to be stored or processed. The temporary parking key can be deleted again at least on the mobile communication apparatus, after the processing of the completed parking procedure, i.e. after the opening of the second blocking device which blocks the exit. The key can also be deleted in the central control device. However, with regard to documentation purposes, it can also make sense here to store the respective key also over the longer term.

The invention is hereinafter described by way of example and by way of the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWING

In the drawing:
The only FIGURE schematically shows a parking area access control system according to the invention

DESCRIPTION OF THE PREFERRED EMBODIMENTS

Referring to the drawing, the parking area access control system which is shown in the FIGURE, as a central control device comprises a server which via the internet 4 or another suitable computer network is connected to two represented first and second blocking devices in the form of barriers 6 and 8, for data communication, wherein the barrier 6 functions as an entrance barrier (a first blocking device) for example of a multi-storey car park, and the barrier 8 as an exit barrier (a second blocking device). It is to be understood that a multitude of corresponding barriers 6, 8 can be connected to the server 2. A connection of the barriers 6, 8 of different multi-storey car parks to a common serve 2 via the internet 4 is also possible.

The barriers 6 and 8 in each case comprise a local control 10 which comprises a communication interface for connection to the data network such as the internet 4 shown here. The local controls 10 can therefore communicate with the server 2 via the internet 4 and in particular receive commands from the server 2, for opening and closing the barriers 6, 8. The barriers 6, 8 moreover in each case comprise a detector device in the form of an induction loop 12 which via evaluation electronics 14 can communicate either directly with the local control 10 of the respective barrier 6, 8 or however directly with the server 2 via the internet 4. The evaluation electronics 14 can thus transmit a signal to the server 2, as to whether a vehicle is in front of the respective barrier 6, 8 or not.

The system moreover comprises one or more payment terminals 16, of which only one is shown in the FIGURE. With regard to the payment terminal 16, it can be the case of a pay station of the known design, which comprises a coin insert, a banknote receiver as well as devices for payment by way of a credit card or bank card as the case may be. The payment terminal 16 is likewise connected to the internet 4 and can communicate with the server 2 via this. Thus, in particular, the server 2 can notify the payment terminal 16 as to which amounts are to be collected, and the payment terminal 16 can report back to the server 2 concerning the effected payment procedure.

The server 2 is finally also connected via the internet 4 to a mobile network 18, via which mobile telephones 20 can access the internet 4 in a wireless manner. Only one mobile telephone 20 (mobile communication apparatus) is shown in the FIGURE, but it is to be understood that a multitude of mobile telephones can communicate with the server 2 in this manner. The mobile telephones, with which it is the case of so-called smartphones, are equipped with a corresponding software application for the parking area access control system, which is to say a corresponding app, which controls or carries out the necessary communication procedures.

Moreover, identification elements in the form of radio emitters are arranged at/on the barriers 6, 8 as well as the payment terminal 16, and these emitters operate according to the Bluetooth low energy standard and continuously and repeatedly emit an identification key which unambiguously identifies it. With regard to these radio emitters 22, it is the case of so-called beacons. The identification keys of these radio emitters 22 are stored in a data bank in the server 2, so that the server 2 has an assignment as to which component has which identification key. The radio emitters 22 represent autonomous components which do not communicate or interact with the further control devices of the barriers 6, 8 as well as of the payment terminal 16. The radio emitters 22 locally at the location of their arrangement merely require an energy supply which can either be effected by way of connection to the electricity mains, or as the case may be, also batteries. The radio emitters 22 can therefore be very easily integrated into the devices such as barriers 6, 8 and payment terminals 16, and, as the case may be, can also be easily retrofitted in existing installations. The application on mobile telephones 20 utilizes a Bluetooth receiver in the mobile telephone 20, in order to receive the signals of the radio emitters 22, and to thus read out the identification key of the respective radio emitter 22.

The course of a parking procedure is now effected in the shown system as follows. If a vehicle, whose user carries with him a mobile telephone 20 with the necessary software application, approaches the entrance barrier 6, then the induction loop 22 detects the vehicle in front of the barrier 6 and notifies this to the evaluation electronics 14 and via the internet 4 to the server 2. The mobile telephone 20 in this position simultaneously receives the signal from the radio emitter 22 at the entrance barrier and thus reads out the identification key of this radio emitter. The thus received identification key is transmitted from the mobile telephone 20 via the mobile network 18 and the internet 4 to the server 2. The server 2 now in the reverse direction can transfer a command to the application on the mobile telephone 20, via the internet 4 and the mobile network 18, and this command outputs an enquiry as to whether the user wishes to drive into the multi-storey car park. If the user confirms this, then the mobile telephone 20 again via the mobile network 18 and the internet 4 sends a request signal to the server 2 with the wish to drive into the multi-storey car park. The server 2 has knowledge of the barrier, in front of which the user with his mobile telephone 20 is located, on account of the transfer of the identification key of the associated radio emitter 22, and can initiate this entrance barrier 6 to open by way of transferring a corresponding command via the internet 4 to the local control of the barrier 10. The server 2 moreover generates a temporary parking key which represents a virtual parking ticket and transfers this via the internet 4 and the mobile network 18 to the mobile telephone 20, in which this parking key is stored. The temporary parking key is preferably generated from the identification key of the radio emitter 22 which was detected by the mobile telephone 20 at the entrance barrier 6 and generates a time stamp. This is an unambiguous identification, since only one vehicle can be located at the same point in time in front of the same barrier. The server 2 in its internal data bank can simultaneously store the fact that the user with his now generated temporary parking key has driven into the multi-storey car park at a certain time at which the entrance barrier 6 was opened by the server 2 in the described manner. The barrier 6 is closed again in the known manner after the entry of the vehicle, which can be effected via a second induction loop which is not shown here, or in a time-controlled manner.

If the user now wishes to leave the parking area or the multi-storey car park, he must firstly pay for his parking time. For this, he can go to the payment terminal 16 with his mobile telephone 20, with the system shown here. This terminal is likewise equipped with a radio emitter 22. The user, when he is in front of the payment terminal 16, on the application on his mobile telephone 20 can input the wish to now pay for the parking time, whereupon the mobile telephone 20 receives the identification key of the radio emitter 22 at the payment terminal 16 and transfers the payment wish with this identification key to the server 2 via the mobile network 18 and the internet 4. The mobile telephone 20 together with the payment wish likewise transmits the temporary parking key. The parking duration can now be determined in the server 2 by way of the current time and the stored drive-in time, and it can be determined at which payment terminal 16 the user is located with his mobile telephone 20 by way of the received identification key. The server 2 then transmits the necessary price information and the command to start a payment procedure, to this thus identified payment terminal 16. The payment terminal 16 thereupon displays the amount to be paid and carries out a payment procedure, which can be processed in the conventional manner by way of cash or bank card or credit card of the user. The payment terminal 16 by way of a suitable signal via the internet 4, confirms to the server 2 that the payment procedure is completed and the server 2 stores the point in time of the payment procedure together with the parking key.

The user with his mobile telephone 20 can then subsequently drive with his vehicle to the exit barrier 8. There, the mobile telephone 20 receives a signal with an identification key of the radio emitter 22 at the exit barrier 8 and again transmits the temporary parking key and the identification key of the radio emitter 22 of the exit barrier 8 via the internet 4 to the server 2. The induction loop 12 via the evaluation electronics 14 can subsequently notify the server 2 that a vehicle is indeed in front of the exit barrier 8. The server 2 then checks as to whether a payment procedure has been carried out for the received parking key. If yes, it then sends a signal to that exit barrier 8, whose identification key it has received from the mobile telephone 20, so as to open this exit barrier 8, and the user can drive out of the parking area. The temporary parking key can now be automatically deleted on the mobile telephone 20.

It should be noted that in the case that the user carries out a cash payment at the payment terminal, the complete parking procedure including the payment procedure can be carried out in a completely anonymous manner, since no user data whatsoever nor specific data of the respective mobile telephone 20 needs to be acquired or stored by the server 2. It is only with a payment procedure via bank connections, credit card and likewise that corresponding user data is to be acquired. Such a payment can likewise be effected at the payment terminal 16, or however also directly via the mobile telephone 20. Possible bank data for payment can therefore also be inputted or stored directly in the application of the mobile telephone 20, and transferred to the server 2 which then processes the cashless payment procedure. It would also be possible to deposit (store) the necessary bank data on the server 2 beforehand, and to merely transfer the command for carrying out and booking the payment procedure to the server 2 via the application on the mobile telephone 20.

A significant feature of the described system is the fact that the mobile telephone 20 does not communicate directly with the local components of the system, specifically the barriers 6, 8 or their local controls 10 and the payment terminal 16. The mobile telephone 20 communicates with the sever 2 exclusively via the internet 4. The mobile telephone 20 merely acquires the radio signals with the identification keys from the radio emitters 22 arranged on the relevant components such as barriers 6 and 8 and payment terminal 16. Thus, essentially only a precise localization of the mobile telephone 20 is achieved, so that the mobile telephone 20 can merely inform the server 2 regarding the respective component of the system, at which this mobile telephone is currently located. This on the one hand has the advantage that the geographic coordinates do not need to be detected at all, so that no positional monitoring of the user of the mobile telephone 20 takes place whatsoever. On the other hand there is the advantage that this system described here can also function without any problem in closed spaces, in contrast to the use of a localization of the mobile telephone 20 via GPS data. The outcome of this system is that it is not the mobile telephone 20 or the user which notifies itself at the respective blocking device or barrier 6, 8 at the entrance, but the respective barrier 6, 8 announces itself to the mobile telephone 20.

The described system can be integrated very simply into web-based access control systems since only a software adaptation and the attachment of a radio emitter 22 is necessary. Moreover, only the associated parking-app needs to be installed on the mobile telephone 20 of the user. The part of the described system which is located on the mobile telephone 20 could also be integrated directly into the vehicle electronics of vehicle.

While specific embodiments of the invention have been shown and described in detail to illustrate the application of the principles of the invention, it will be understood that the invention may be embodied otherwise without departing from such principles.

APPENDIX

List of Reference Characters

2 server
4 internet
6 barrier or entrance barrier
8 barrier or exit barrier
10 local control
12 induction loop
14 evaluation electronics
16 payment terminal 18 mobile network
20 mobile telephone
22 radio emitter or beacon

What is claimed is:

1. A parking area access control system comprising:
   a central control device;
   at least one blocking device connected, for data communication, to the central control device such that the blocking device can be opened by a command of the control device;
   an identification element arranged on the blocking device;
   an identification key, the identification element with the identification key unambiguously identifying the blocking device; and
   at least one mobile communication apparatus connected to the control device for data communication, the at least one mobile communication apparatus being configured for reading out the identification key from the identification element, wherein:
   the at least one mobile communication apparatus and the control device interact in a manner such that the identification key is read out by the at least one mobile communication apparatus and is transmitted from the at least one mobile communication apparatus to the control device;
   the control device or the at least one mobile communication apparatus generates a temporary parking key;
   the identification element is a radio emitter configured for the Bluetooth low energy standard, and the at least one mobile communication apparatus comprises a corresponding radio receiver;
   the identification element comprises an autonomous system continuously emitting the identification key; and
   the control device, as a reaction to a request signal sent from the at least one mobile communication apparatus to the control device, opens the blocking device which is identified by the identification key.

2. A parking area access control system according to claim 1, wherein an identification of the mobile communication apparatus by the control device is effected exclusively on the basis of the temporary parking key, wherein the identification element is not connected to the central control device.

3. A parking area access control system according to claim 1, wherein the at least one mobile communication apparatus and the control device each comprise a memory and are configured in a manner such that they store the temporary parking key, wherein the identification element operates independent of the central control device.

4. A parking area access control system according to claim 1, wherein the control device or the mobile communication apparatus is configured to generate the temporary parking key from the identification key received from the communication apparatus and from a time stamp, wherein the identification element is not in communication with the central control device.

5. A parking area access control system according to claim 1, further comprising:
   at least one second blocking device connected, for data communication, to the central control device such that the second blocking device can be opened by a command of the control device;
   an identification element arranged on the second blocking device;
   an identification key, the identification element with the identification key unambiguously identifying the blocking device, wherein the control device is configured to, on receiving the identification key of the second blocking device from the communication apparatus, retrieve the temporary parking key stored in the communication apparatus and open this second blocking device after the verification of a payment procedure for this temporary parking key.

6. A parking area access control system according to claim 5, further comprising at least one payment terminal connected to the control device for data communication, wherein the control device is further configured to open the second blocking device on receiving the request signal and after confirmation of a payment procedure by the payment terminal.

7. A parking area access control system according to claim 1, further comprising at least one payment terminal, said payment terminal being connected to the control device for data communication and comprising an identification element with an identification key unambiguously identifying the payment terminal, wherein the at least one mobile communication apparatus is configured to read out the identification key from the identification element, and the mobile communication apparatus and the control device interact such that the identification key is read out by the communication apparatus and is transmitted from the communication apparatus to the control device, and the control device initiates the thus identified payment terminal into carrying out a payment procedure.

8. A parking area access control system according to claim 1, wherein the at least one blocking device or the at least one second blocking device is connected to the control device via the internet.

9. A parking area access control system according to claim 1, wherein the at least one mobile communication apparatus is connected to the control device via a mobile network and or the internet or both a mobile network and the internet.

10. A parking area access control system according to claim 1, wherein the at least one mobile communication apparatus is a mobile telephone or a communication apparatus which is integrated into a vehicle.

11. A parking area access control system according to claim 10, wherein the mobile communication apparatus is a common mobile telephone, into which the functions necessary for the access control system are integrated by a software application.

12. A parking area access control system according to claim 1, wherein the data communication between the at least one mobile communication apparatus and the control device is bidirectional.

13. A parking area access control system according to claim 1, wherein the identification element and the at least one mobile communication apparatus are configured for a unidirectional communication between the identification element and the communication apparatus.

14. A parking area access control system according to claim 1, further comprising at least one detector arranged on the at least one blocking device or on a second blocking device or both on the at least one blocking device or on the second blocking device and wherein the detector is connected to the control device for data communication and is configured for a detection of a vehicle which is in front of the blocking device.

15. A method for controlling the access into a parking area, the method comprising the steps of:
   providing a central control device;
   providing at least one blocking device, blocking an exit, connected, for data communication, to the central control device such that the blocking device can be opened by a command of the control device;

providing an identification element arranged on the blocking device;
providing an identification key, the identification element with the identification key unambiguously identifying the blocking device; and
providing at least one mobile communication apparatus connected to the control device for data communication, the at least one mobile communication apparatus being configured for reading out the identification key from the identification element, the identification element comprising a radio emitter configured for the Bluetooth low energy standard, and the at least one mobile communication apparatus comprising a corresponding radio receiver, the identification element comprising an autonomous system continuously emitting the identification key;
reading out the identification key of the blocking device, by the mobile communication apparatus;
transmitting the read-out identification key from the mobile communication apparatus to the central control device;
transmitting a request signal for requesting the opening of the blocking device, from the at least one mobile communication apparatus to the central control device;
generating a temporary parking key in the control device or the mobile communication apparatus; and
opening the at least one blocking device identified by the identification key, by way of the central control device, as a reaction to the request signal.

16. A method according to claim 15, wherein the mobile communication apparatus transmits the temporary parking key to the control device, for identification at a payment terminal or at a second blocking device blocking an exit, wherein the identification element is not connected to the central control device.

17. A method according to claim 15, further comprising the steps of:
reading out an identification key of a second blocking device blocking an exit, by the mobile communication apparatus;
transmitting the read-out identification key from the mobile communication apparatus to a central control device;
transmitting a request signal with the temporary parking key for requesting the opening of the second blocking device, from the mobile communication apparatus to the central control device;
verifying a payment procedure for the received, temporary parking key, by the control device; and
opening the second blocking device which is identified by the identification key, by the central control device given a successful verification.

18. A method according to claim 15, wherein the control device only opens the blocking device when a vehicle which is in front of the blocking device is recognized by a detector at the blocking device, wherein the identification element operates independent of the central control device.

19. A method according to claim 17, wherein the control device only opens the blocking device or the second blocking device when a vehicle in front of opens the blocking device or the second blocking device is recognized by a detector at the blocking device or the second blocking device, wherein the identification element operates independent of the central control device.

20. A parking area access control system comprising:
a central control device;
a blocking device connected, for data communication, to the central control device such that the blocking device can be opened by a command of the control device;
an autonomous wireless radio emitter arranged on the blocking device, the autonomous wireless radio emitter being configured for a Bluetooth low energy standard;
an identification key, the identification element with the identification key unambiguously identifying the blocking device, the autonomous wireless emitter continuously emitting the identification key; and
at least one mobile communication apparatus connected to the control device for data communication, the at least one mobile communication apparatus being configured for reading out the identification key from the identification element, the at least one mobile communication apparatus comprising a radio receiver, the autonomous wireless radio emitter being in communication with only the at least one mobile communication apparatus, wherein:
the mobile communication apparatus and the control device interact in a manner such that the identification key is read out by the radio receiver of the communication apparatus and is transmitted from the communication apparatus to the control device;
the control device or the mobile communication apparatus generates a temporary parking key; and
the control device, as a reaction to a request signal sent from the communication apparatus to the control device, opens the blocking device which is identified by the identification key.

* * * * *